(12) United States Patent
Abad et al.

(10) Patent No.: US 8,579,029 B2
(45) Date of Patent: Nov. 12, 2013

(54) SYSTEM, METHOD AND TREATMENT FLUID FOR CONTROLLING FINES MIGRATION

(75) Inventors: Carlos Abad, Aberdeen (GB); Yenny Christanti, Houston, TX (US); Syed Ali, Sugar Land, TX (US); Balkrishna Gadiyar, Katy, TX (US); Brent Busby, Richmond, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 392 days.

(21) Appl. No.: 12/643,431

(22) Filed: Dec. 21, 2009

(65) Prior Publication Data
US 2010/0163233 A1   Jul. 1, 2010

Related U.S. Application Data

(60) Provisional application No. 61/141,966, filed on Dec. 31, 2008.

(51) Int. Cl.
| | |
|---|---|
| *E21B 33/138* | (2006.01) |
| *E21B 43/04* | (2006.01) |
| *E21B 43/26* | (2006.01) |
| *E21B 43/27* | (2006.01) |
| *C09K 8/60* | (2006.01) |

(52) U.S. Cl.
USPC ........... 166/278; 166/281; 166/282; 166/283; 166/294; 166/305.1; 166/308.2; 507/234; 507/251

(58) Field of Classification Search
None
See application file for complete search history.

(56) References Cited

U.S. PATENT DOCUMENTS

| | | | |
|---|---|---|---|
| 3,382,924 A | | 5/1968 | Veley et al. |
| 3,692,676 A | | 9/1972 | Cutler et al. |
| 4,158,521 A | * | 6/1979 | Anderson et al. ............. 405/264 |
| 4,231,428 A | | 11/1980 | Needham et al. |

(Continued)

FOREIGN PATENT DOCUMENTS

| | | |
|---|---|---|
| EP | 0392697 | 10/1990 |
| WO | 2010076744 | 7/2010 |

OTHER PUBLICATIONS

Maberry, L. J. et al. SPE49102. "Formation Fines Stabilization Using Surface Adsorption Polymerization."1996 SPE Annual Technical Conference and Exhibition held in New Orleans, Louisiana, Sep. 27-30, 1998.

(Continued)

*Primary Examiner* — George Suchfield
(74) *Attorney, Agent, or Firm* — David G. Matthews; Brandon S. Clark; Daniel Lundeen

(57) ABSTRACT

A method includes providing a treatment fluid that is a viscous fluid. The viscous fluid may be greater than 0.01 Pa-s, greater than 0.1 Pa-s, and/or a cross-linked polymer based fluid. The method further includes determining a fines migration composition soluble in an aqueous phase of the treatment fluid that is compatible with the treatment fluid, and that interacts to secure fines in an earth formation intersecting a wellbore within a fines reaction time. The method further includes adding an amount of the fines migration composition to the treatment fluid, and treating the earth formation with the treatment fluid. The method includes leaking off a portion of the treatment fluid into the earth formation, and providing a residence time of the leaked off portion of the treatment fluid in the earth formation, where the residence time meets or exceeds the fines reaction time.

24 Claims, 6 Drawing Sheets

(56) References Cited

U.S. PATENT DOCUMENTS

| | | | |
|---|---|---|---|
| 4,291,766 A | 9/1981 | Davies | |
| 4,366,071 A | 12/1982 | McLaughlin | |
| 4,366,072 A | 12/1982 | McLaughlin | |
| 4,366,073 A | 12/1982 | McLaughlin | |
| 4,366,074 A | 12/1982 | McLaughlin | |
| 4,374,739 A | 2/1983 | McLaughlin | |
| 4,427,069 A | 1/1984 | Friedman | |
| 4,462,718 A | 7/1984 | McLaughlin | |
| 4,469,503 A | 9/1984 | Stockel | |
| 4,536,303 A | 8/1985 | Borchardt | |
| 4,536,304 A | 8/1985 | Borchardt | |
| 4,536,305 A | 8/1985 | Borchardt et al. | |
| 4,563,292 A | 1/1986 | Borchardt | |
| 4,580,633 A * | 4/1986 | Watkins et al. | 166/295 |
| 4,623,022 A | 11/1986 | Chakrabarty | |
| 4,693,639 A | 9/1987 | Hollenbeak et al. | |
| 4,708,207 A | 11/1987 | Kalfayan et al. | |
| 4,787,453 A | 11/1988 | Hewgill et al. | |
| 4,806,633 A | 2/1989 | Ezure et al. | |
| 4,828,726 A | 5/1989 | Himes et al. | |
| 5,160,642 A | 11/1992 | Schield et al. | |
| 5,199,492 A | 4/1993 | Surles | |
| 5,330,005 A | 7/1994 | Card | |
| 5,439,055 A | 8/1995 | Card | |
| 5,501,275 A | 3/1996 | Card | |
| 5,551,514 A | 9/1996 | Nelson et al. | |
| 5,775,425 A | 7/1998 | Weaver | |
| 5,805,593 A | 9/1998 | Busche | |
| 5,833,000 A | 11/1998 | Weaver | |
| 5,839,510 A | 11/1998 | Weaver | |
| 5,853,048 A | 12/1998 | Weaver | |
| 5,853,408 A | 12/1998 | Muni | |
| 5,871,049 A | 2/1999 | Weaver | |
| 5,887,653 A | 3/1999 | Bishop et al. | |
| 6,047,772 A | 4/2000 | Weaver | |
| 6,439,309 B1 | 8/2002 | Matherly et al. | |
| 7,104,825 B2 | 9/2006 | Kajiwara | |
| 7,284,610 B2 | 10/2007 | Poelker et al. | |
| 7,328,745 B2 | 2/2008 | Poelker et al. | |
| 2005/0098504 A1 | 5/2005 | Manz et al. | |
| 2006/0289164 A1 * | 12/2006 | Smith et al. | 166/295 |
| 2007/0012445 A1 * | 1/2007 | Nguyen et al. | 166/281 |
| 2007/0155630 A1 | 7/2007 | Hoch et al. | |
| 2007/0158070 A1 | 7/2007 | Endres et al. | |
| 2007/0204990 A1 | 9/2007 | Kotlar et al. | |
| 2008/0257553 A1 | 10/2008 | Gatlin et al. | |
| 2009/0065207 A1 | 3/2009 | Shenoy et al. | |
| 2009/0065209 A1 | 3/2009 | Huang et al. | |
| 2009/0192053 A1 * | 7/2009 | Crews et al. | 507/201 |

OTHER PUBLICATIONS

Manrique, J.F. et al., SPE64384. "Integrated Stimulation Applications and Best Practices for Optimizing Reservoir Development Through Horizontal Wells." SPE Asia Pacific Oil and Gas Conference and Exhibition held in Brisbane, Australia, Oct. 16-18, 2000.

El Shaari, N., SPE114220. "Utilizing Organosilane with Hydraulic Fracturing Treatments to Minimize Fines Migration into the Proppant Pack—A Field Application." 2008 SPE Western Regional and Pacific Section AAPG Joint Meeting held in Bakersfield, California, U.S.A., Mar. 31-Apr. 2, 2008.

Sarkar A.K. and Sharma M.M., "Fines Migration in Two-Phase Flow Paper". JPT (May 1990). pp. 646-652.

Borchardt, J. K., Roll, D. L, and Rayne, L M., "Use of a Mineral Fines Stabilizer in Well Completions", SPE 12757, SPE California Regional Meeting, Apr. 1984; pp. 1-14.

Borchardt, J. K., "Organic Polymer Formation Damage Control Chemicals A Review of Basic Chemistry and Field Results", Symposium on Advances in Oil Field Chemistry Presented Before the Division of Petroleum Chemistry, Inc., American Chemical Society, Jun. 1988; pp. 60-67.

IPRP, PCT/IB2009/055915, Schlumberger Canada Limited, Jul. 5, 2011.

* cited by examiner

SYSTEM, METHOD AND TREATMENT FLUID FOR CONTROLLING FINES MIGRATION

RELATED APPLICATIONS

This application is related, and claims the benefit of, U.S. Provisional Patent Application 61/141,966 entitled "Method of controlling fines migration", filed on Dec. 31, 2008, which is incorporated herein by reference.

BACKGROUND

This invention relates to compositions and methods for treating subterranean formations, in particular, oilfield stimulation compositions and methods using essentially non-crystalline gelling agents. The statements in this section merely provide background information related to the present disclosure and may not constitute prior art.

Transport of particulate solids during the production of hydrocarbons from a subterranean formation is a continuing problem. The use of sand control methods such as stand alone screens, gravel packs, and frac and pack treatments is a common practice to mitigate, minimize or prevent the return of solids to surface. The transported solids can plug, erode or cause significant wear in hydrocarbon-production equipment during recovery. The solids can also clog or plug the formation or wellbore, thereby limiting or completely stopping fluid production. Further, the transported particulates must be separated from the recovered hydrocarbons, adding further expense. The source of transported particulates may be the formation or particulates added such as fines present with a proppant or produced from partially crushed proppant.

Presently known fines migration techniques suffer from a few drawbacks. Present fines migration control treatments are not positioned deep into the formation to control fines where they are generated and where the pressure drop disturbing the fines is relatively low. Many fines migration techniques are provided as a pre- or post-fracturing or gravel pack treatment (e.g. the FinesLOK® service, registered to Schlumberger Technology Corporation), or as a treatment that fixes fines within a propped fracture or a gravel pack (e.g. the Sand Wedge® service, registered to Hallburton Energy Services). The latter prevents fines migration into the wellbore, but allow the formation fines to migrate into the fracture or against the gravel pack before they are fixed, damaging the permeability of the fracture and/or the gravel pack. Further, present fines migration control treatments are presented in low viscosity fluids subject to fluid fingering and highly non-uniform distribution of the fluid into the formation. Present fines migration fluids utilize additional treatment steps and fluids from a primary fluid treatment, increasing costs, complicating the treatment schedule, and increasing the physical footprint of the treatment equipment. Therefore, further technological developments are desirable in this area.

SUMMARY

One embodiment is a unique method for controlling fines migration in an earth formation. Other embodiments include unique methods, systems, and treatment fluids to control fines migration in an earth formation. Further embodiments, forms, objects, features, advantages, aspects, and benefits shall become apparent from the following description and drawings.

DESCRIPTION OF THE ILLUSTRATIVE EMBODIMENTS

Figure 1:
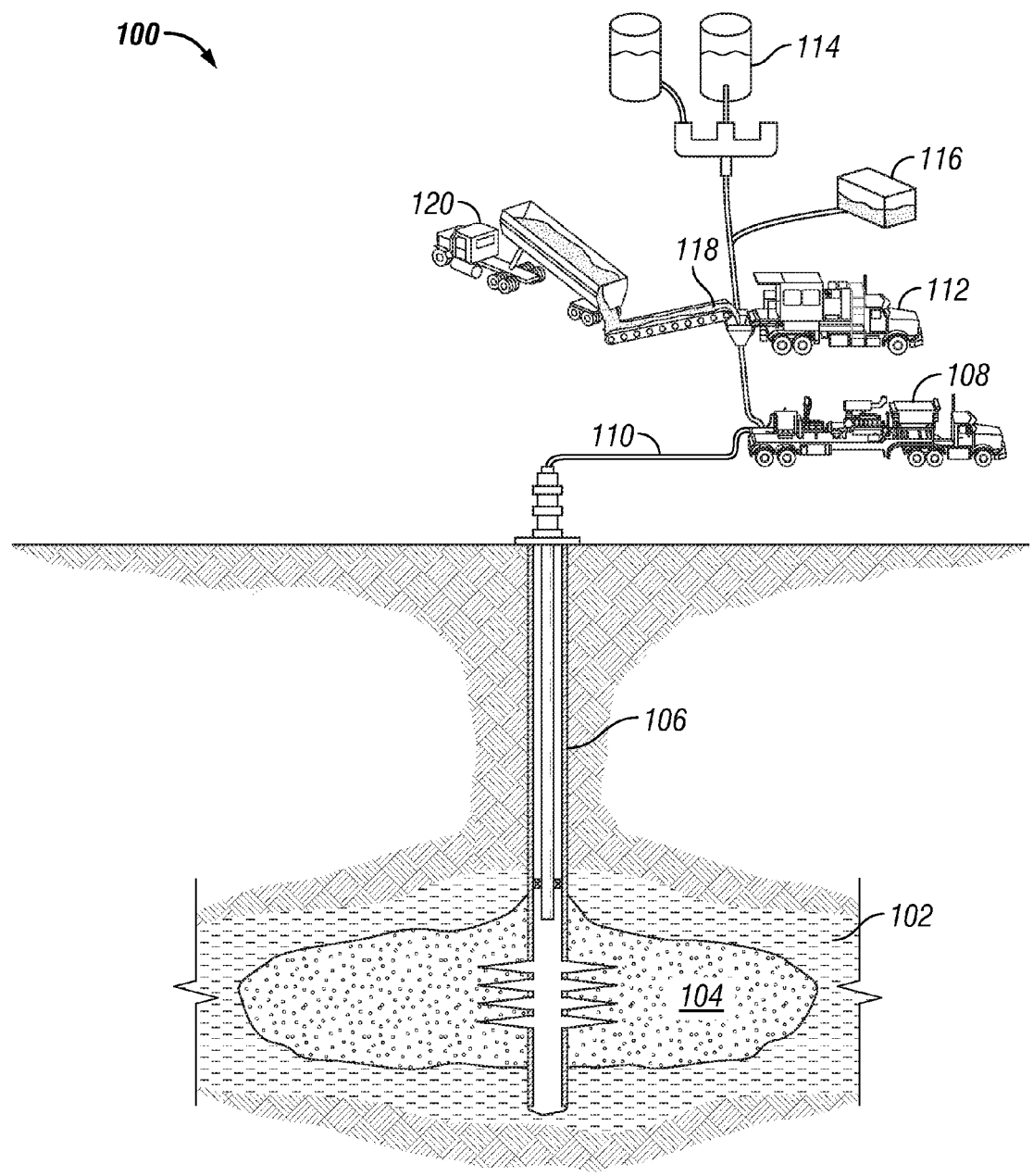
FIG. 1 is a schematic diagram of a system for controlling fines migration in an earth formation.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of describing illustrative embodiments and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

FIG. 1 is a schematic diagram of a system 100 for controlling fines migration in an earth formation 102. The system 100 includes a wellbore 106 intersecting the earth formation 102, and a pump 108 fluidly coupled to the wellbore 106 on a downstream side and to a blender 112 on an upstream side. The pump 108 and blender 112 are shown as separate equipment, but may be included in the same device. The blender 112 is any device allowing additives 116 to be placed in a base fluid 114, and the blender 112 in certain embodiments may be fluid tanks where additive 116 are mixed into the base fluid 114 before a treatment is performed. In certain embodiments, the system includes a treatment fluid 110 that is a viscous fluid. The treatment fluid may have a viscosity greater than 0.01 Pa-s, greater than 0.1 Pa-s, greater than 0.3 Pa-s, and/or the treatment fluid 110 that is a cross-linked polymer based fluid.

Exemplary embodiments of the system 100 include a treatment fluid 110 for treating the earth formation 102 intersecting the wellbore 106. The treatment fluid 110 includes a cross-linked polymer fluid, and an amount of a cationic poly-amine in an aqueous phase of the cross-linked polymer fluid. The amount of the cationic poly-amine includes an effective amount to substantially lock fines in the earth formation 102 in a leakoff region of the earth formation 102. The amount of cationic poly-amine that is effective to substantially lock fines is readily determined by core testing of the earth formation 102, and/or by testing different values over a few treatments of the earth formation 102 until an effective amount is determined. The amount of fines migration reduction that substantially locks fines is dependent upon the characteristics of the system 100.

Non-limiting examples of substantially locked fines include: a fines reduction amount to below a threshold concentration of fines in a produced fluid; a fines reduction amount to below a mass of fines produced from a treated core based on a specified cumulative fluid flow amount; a fines reduction amount that provides a threshold reduction in production equipment wear; a fines reduction amount to below a specified percentage of an untreated fines amount; and/or a fines reduction amount that provides a threshold reduction in fines separation costs from a produced fluid. The determination of the effective amount of the cationic poly-amine may be determined from core tests on the earth formation 102, from experience in offset wells from the wellbore 106, and/or as an iterative field development process until after a number of wellbores 106 are treated an effective amount of the cationic poly-amine is determined. In certain embodiments, the amount of the cationic poly-amine includes an amount at least equal to 0.025% of the treatment fluid 110 by volume, an amount at least equal to 0.05% by volume, and/or an amount at least equal to 0.2% by volume.

The preceding examples describe a cationic poly-amine used for fines control, but the fines control additive may alternatively or additionally include a water clarifier, an organosilane, a cationic poly-amine, Arklear® 4042X, Arklear® 4045, Arklear® 4065, or any mixtures thereof. The Arklear® compounds are trademarked compounds produced by Baker Hughes Incorporated. The fines control additive is a fines migration composition soluble in an aqueous phase of the treatment fluid 110 that is compatible with the treatment fluid 110, and that interacts to secure fines in the earth formation 102 intersecting a wellbore 106 within a fines reaction time. The solubility and compatibility of the fines migration composition may be determined through fluid testing, including checking for precipitation in the treatment fluid 110 in response to the addition of the fines migration composition, and/or by determining chemical effects (e.g. a pH change or chemical reaction in the treatment fluid 110) in response to the addition of the fines migration composition. In certain embodiments, the fines migration composition includes a cationic poly-amine combined with an amount of an organosilane.

In certain embodiments, the treatment fluid 110 further includes an amount of a pH buffer that offsets a pH effect of the fines migration composition. In an exemplary embodiment, a cationic poly-amine reduces a pH of the treatment fluid 110 and the pH buffer includes a basic compound (e.g. a sodium hydroxide solution) that at least partially restores a pH of the treatment fluid 110. An exemplary embodiment includes the fines migration composition as a cationic poly-amine including a water clarifier that is Arklear® 4042X, Arklear® 4045, and/or Arklear® 4065, where the treatment fluid 110 includes a cross-linked polymer that cross-links at a pH below 10. An alternate embodiment includes the fines migration composition as a cationic poly-amine including a water clarifier that is Arklear® 4042X, where the treatment fluid 110 includes a cross-linked polymer that cross-links at a pH above 10.

In certain embodiments, the system includes a means for controlling fines migration from the earth formation 102 after the pump 108 delivers the treatment fluid 110 into the earth formation 102. Exemplary means for controlling fines migration include a cationic poly-amine in the treatment fluid 110, where the cationic poly-amine is selected for compatibility with the treatment fluid 110 and does not precipitate in the treatment fluid 110. Another exemplary means for controlling fines migration includes a water clarifier in the treatment fluid 110, where the water clarifier is selected for compatibility with the treatment fluid 110 and does not precipitate in the treatment fluid 110.

Another exemplary means for controlling fines migration includes Arklear® 4042X included in the treatment fluid 110, and a further means includes the treatment fluid 110 including a cross-linked polymer that cross-links above a pH of 10. Another exemplary means for controlling fines migration includes Arklear® 4045, Arklear® 4065, and/or Arklear® 4042X included in the treatment fluid, and a further means includes the treatment fluid 110 including a cross-linked polymer fluid that cross-links below a pH of 10. A further exemplary means for controlling fines migration includes an amount of a pH buffer included in the treatment fluid that offsets a pH effect of fines controlling composition. Another exemplary means for controlling fines migration includes a fines migration composition that is a cationic poly-amine and/or a water clarifier, combined with an amount of an organosilane included in the treatment fluid 110.

Another exemplary means for controlling fines migration includes providing a fines migration composition within a treatment fluid 110 utilized in a gravel pack operation, a fracturing treatment operation, a remedial treatment, an acidizing treatment, and/or a combined fracture and gravel pack operation (a frac and pack). A remedial treatment includes any type of treatment understood in the art to enhance the productivity or treat any issue in the well, including at least treatments for wettability, corrosion, or fluid emulsions. An acidizing treatment includes any type of acid-utilizing treatment, including at least a matrix acid treatment, an acid fracturing treatment, and/or an emulsified acid treatment. Yet another exemplary means for controlling fines migration includes providing a fines migration composition within a treatment fluid 110 utilized in a pre-pad, a pad, and/or a proppant stage of a fracturing treatment operation.

Another exemplary means for controlling fines migration includes providing a fines migration composition within a treatment fluid 110 in an amount greater than 0.025% by volume of the treatment fluid 110, in an amount greater than 0.05% by volume of the treatment fluid 110, or in an amount greater than 0.2% by volume of the treatment fluid 110. Another exemplary means for controlling fines migration includes providing the treatment fluid 110 having a polymer that builds a filter-cake in response to leak-off of the treatment fluid 110 into the formation 102, providing a fines migration composition dissolved into an aqueous phase of the treatment fluid 110, and leaking off a portion of the aqueous phase of the treatment fluid 110 through the filter-cake into the earth formation 110 thereby substantially locking fines in the earth formation 102 into position. The means further includes leaking the aqueous phase of the treatment fluid 110 into a leakoff region of the earth formation 102, where the leakoff region comprises the formation 102 proximate to the filter-cake. In certain embodiments, the leakoff region is the portion of the earth formation 102 in proximity to a fracture 104, illustrated in FIG. 1 as a fracture having vertically oriented wings but which may be any type of fracture 104 produced by the injection of the treatment fluid 110.

The system 100 is illustrated as a land-based location having a drilled wellbore 106. The exemplary system 100 includes a proppant delivery vehicle 120 that provides proppant 118 to the blender 112. The fluid migration composition may be a part of the additives 116 delivered at the blender 112, or mixed with the base fluid 114, or added by any other means understood in the art. In certain embodiments, the system 100 is at an offshore location (not shown). At offshore locations, and in certain other locations such as environmentally sensitive areas, physical space of equipment and job treatment time are greater constraints than in a general land-based operation.

In certain embodiments, the earth formation 102 is a formation having an intermediate and/or high permeability. Intermediate and high permeability formations generally have greater fines migration problems due to the nature of such formations, they experience higher flow rates which can exacerbate existing fines migration issues, and they generally have greater economic returns justifying treatments that enhance productivity and reduce production issues. The permeability values that constitute "intermediate" and "high" permeability vary with the geology, the presence of natural fracturing, and the type or viscosity of fluid produced (e.g. water, heavy oil, light oil, natural gas, etc.). Generally, without limitation, an intermediate permeability will be 0.1 mD to 5 mD, and in some embodiments 1 mD to 5 mD. High permeability will generally be greater than 1 mD or greater than 5 mD with no upper bound. The provided permeability ranges are exemplary only.

Exemplary techniques for providing fines migration control are described. The exemplary techniques are illustrative of various embodiments of performing operations for providing fines migration control and are understood to be exemplary only. Operations may be combined or divided, and added or removed, as well as re-ordered in whole or part, unless stated explicitly to the contrary herein.

An exemplary embodiment is a technique including an operation to provide a treatment fluid having a viscosity greater than 0.01 Pa-s. Additionally or alternatively, the treatment fluid includes a viscosity greater than 0.1 Pa-s, greater than 0.3 Pa-s, and/or a cross-linked polymer based treatment fluid. The technique further includes an operation to determine a fines migration composition soluble in an aqueous phase of the treatment fluid that is compatible with the treatment fluid, and that interacts to secure fines in an earth formation intersecting a wellbore within a fines reaction time. The fines reaction time may be experimentally or theoretically determined, and in certain embodiments may be dependent upon the type of fines control chemical utilized, the temperature of the earth formation, or other considerations understood in the art. The technique further includes an operation to add an amount of the fines migration composition to the treatment fluid, to treat the earth formation intersecting a wellbore with the treatment fluid, and to leak off a portion of the treatment fluid into the earth formation. The leaked off portion includes at least a portion of the amount of the fines migration composition. The technique further includes an operation to provide a residence time of the leaked off portion of the treatment fluid in the earth formation, where the residence time meets or exceeds the fines reaction time.

The exemplary technique further includes cross-linking the treatment fluid, where the treatment fluid includes a polymer that builds a filter-cake in response to fluid leak-off, and where the operation to leak off the portion of the treatment fluid into the earth formation includes leaking off a portion of the aqueous phase of the treatment fluid through the filter-cake. The treatment may be a hydraulic fracture treatment, and the fines migration composition may be added during a pre-pad, pad, or during proppant stages of the hydraulic fracture treatment.

Another exemplary technique includes an operation to provide a treatment fluid structured for a wellbore treatment, where the wellbore treatment is a fracture treatment, a gravel pack treatment, and/or a frac and pack treatment. The technique further includes an operation to determine a water clarifier that does not produce a precipitate in the treatment fluid, and to add the water clarifier to the treatment fluid in an amount effective to control fines migration in an earth formation. The technique further includes an operation to treat the earth formation with the treatment fluid. In certain embodiments, the treatment fluid includes a polymer that builds a filter-cake in response to fluid leak-off, and the technique further includes an operation to leak off a portion of the treatment fluid into the earth formation, where the leaked off portion includes at least a portion of the water clarifier. The water clarifier may be a cationic poly-amine, and may be included in an amount of at least 0.025% by volume, at least 0.05% by volume, or at least 0.2% by volume.

Another exemplary technique for controlling fines migration is described. The technique includes an operation to select a non damaging cost effective fines migration composition that can be compatible with the fracturing fluid, without major fluid adjustments, and that can remain active as a fines migration additive after fluid loss into the formation by means of permeation through a polymer filtercake. The technique further includes including a suitable concentration of the fines migration control composition in a pad of a fracturing treatment, allowing the treatment of form a fracture in the reservoir, allowing a filtrate of the fluid to flow into the formation across the forming filter cake, and allowing sufficient time for the fines migration control additive to interact with the formation and lock the fines in place. Alternative operations include injecting additive in a prepad stage or a data-frac stage (e.g. a data gathering miniature fracture) ahead of a main fracture treatment. Certain embodiments of the technique include pumping a suitable concentration of the fines migration control composition into proppant stages of a fracturing, frac and pack, or gravel pack treatment. The technique further includes an operation to allow the fracture to close and the formation fluid to start displacing the fracturing or gravel pack fluid.

Yet another exemplary technique for controlling fines migration includes providing a fines migration composition that is non-damaging to the native permeability of the formation, that causes no precipitation within a fracturing fluid formulation, and wherein adding the fines migration composition to the fracturing or gravel pack fluid does not require a significant reformulation effort. The fines migration composition further includes the active fines locking agent in a fluid filtrate after filtration in a fluid loss test.

In certain embodiments, all additives to formulate the fines migration composition 116 are liquid additives. In certain embodiments, the fines migration composition 116 is added to the treatment fluid 110 without the use of any solid particles.

Various exemplary treatment fluids are described. The treatment fluids and data are experimental data determined to illustrate certain aspects of various embodiments of treatment fluids, and may not fully correspond to any particular embodiment of a treatment fluid.

In the following examples, bottle tests and fluid loss experiments were conducted with various chemicals that may comprise fines migration compositions, in certain formations and with certain treatment fluids, to ascertain the ability of the various chemicals to permeate across a filter cake, and to determine the homogeneity and extent of the miscibility of each various chemical within an exemplary treatment fluid. A series of commercially available tackifiers from Nalco were tested for water solubility and dispersability, and were found to agglomerate in the wall of the bottle where the test was being carried out. The same test utilizing a series of water clarifiers sold by Baker Petrolite under the commercial name of Arklear® water clarifiers it was observed that all those were adequately water soluble and dispersible. The same effective dispersion and solubility was observed for an organosilane, commercially termed Tekstim® from Nalco.

Based on these preliminary experiments, a series of products were subsequently tested for fines migration control ability. The extent of fines migration was tested by flowing brine through an unconsolidated sand pack containing a known amount of fines and measuring the amount of fines in the effluent. In certain embodiments, a similar test may be performed with a core of the formation 102, and/or a simulated fracture or gravel pack to determine a fines migration composition 116. The sand pack was 95 wt % 30/70 sand and 5 wt % fines powder of different mineralogies (silica with median diameter of 3.5 microns or kaolinite). The sand and the fines were mixed uniformly and packed into a 1-inch (2.5-cm) diameter Tygon tubing, forming a 3-in (7.5-cm) long sand pack. The sand pack was secured on both ends with flow distributors and the assembly was mounted to a Hassler cell. All tests were performed, except where otherwise noted, under 1,000 pounds per square inch (psi) confining pressure and 150° F. (65.6° C.) temperature. The tests were performed utilizing the following procedure: saturation, treatment, shut-in, and production. The saturation operation included injecting 10 pore volumes of 2% KCl solution at 0.5 mL/min. The treatment operation included injecting 2 pore volumes of treatment fluid at 0.5 mL/min in a reverse direction from the saturation. The shut-in included a 16 hour shut-in period. The shut-in period may be varied in specific embodiments to determine a suitable fines reaction time for the fines migration composition under consideration, and according to the desired shut-in time according to operational considerations. The production operation included injecting 50 pore volumes of 2% KCl solution at 5 mL/min. The effluent was collected at the outlet in 25-mL aliquots and analyzed for turbidity. The turbidity was later converted to concentration of fines through a linear calibration curve. The determination of fines concentrations may be made from turbidity determinations, drying-and-weighing procedures, centrifuging an effluent sample, or by any other method known in the art.

Figure 2:
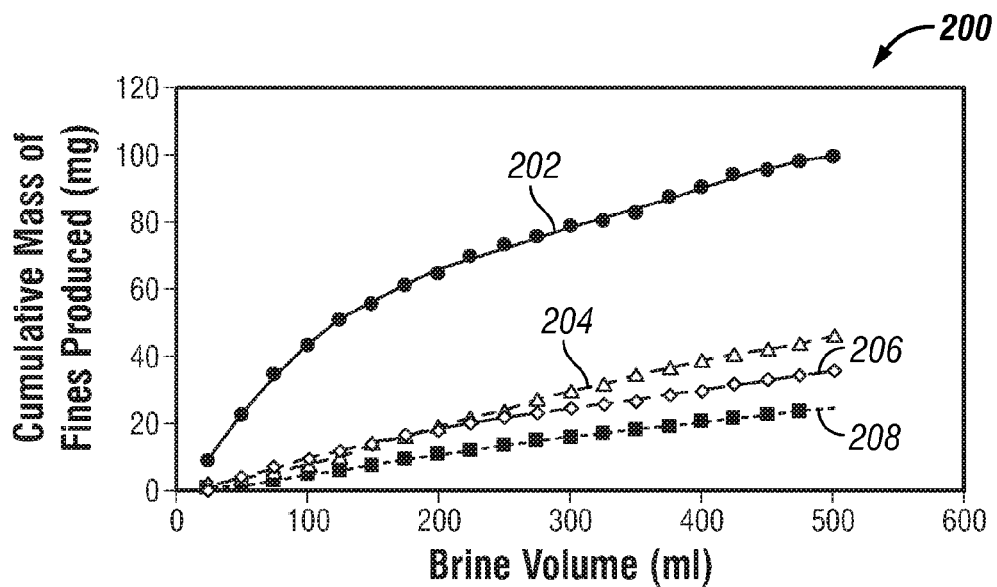
FIG. 2 is an illustration of fines migration control data for a treatment fluid.

FIG. 2 is an illustration 200 of fines migration control data for a treatment fluid, with tests for a baseline fluid and three fluids having fines migration compositions. FIG. 2 shows cumulative mass of fines versus production volume and is based on lab data. In the baseline test (curve 202), the treatment fluid was a solution containing 2 wt % KCl and 0.25 vol % of a 10-20 wt % sodium tetraborate decahydrate aqueous solution, with pH around 9. This base fluid was chosen to simulate the leakoff of a typical fracturing fluid. In the second test (curve 204), the treatment fluid was the base fluid with added Arklear® 4045 at 0.2% by volume and 0.075% by volume of a 30% sodium hydroxide solution to adjust the pH. Arklear 4045® is a cationic polyamine used in the clarification of oilfield and industrial wastewater available from Baker Petrolite. In the third test (curve 208) the treatment fluid was the base fluid containing Arklear® 4045 at 0.2% by volume and 0.075% by volume of a 30% sodium hydroxide solution with added Tekstim® EC9535A at 0.05% by volume. Tekstim® is an organosilane coupling agent available from Nalco. In a fourth test (curve 206) the treatment fluid was the base fluid with added Tekstim® EC9535A at 0.05% by volume.

The data in FIG. 2 illustrate that water clarifiers that are selected for compatibility with the treatment fluid can effectively treat fines migration. The addition of an organosilane, as in the third test 208 can further enhance fines migration control. Testing showed that the chemical Arklear® 4045 exhibited a cloud point at a pH of about 10, resulting in severe precipitation. This was tested at room temperature. A more refined version of the product Arklear® 4045, Arklear® 4065, was tested and exhibited similar precipitation. It was found that while most water clarifiers and cationic polymer species were relatively effective at immobilizing otherwise mobile fines, only a few could prevent any precipitation or cloud point in the treatment fluid, especially at higher pH values. The product Arklear® 4042X was tested according to the same experimental procedures, and while Arklear® 4042X also exhibited excellent fines mobilization control it showed no apparent precipitation or clouding, indicating acceptable solubility in the treatment fluid aqueous phase. The tests were reproduced at room temperature and also at 225° F. (107° C.). Thus, testing of the fluid and selection of a compatible fluid is beneficial to successfully treating fines migration.

Figure 3:
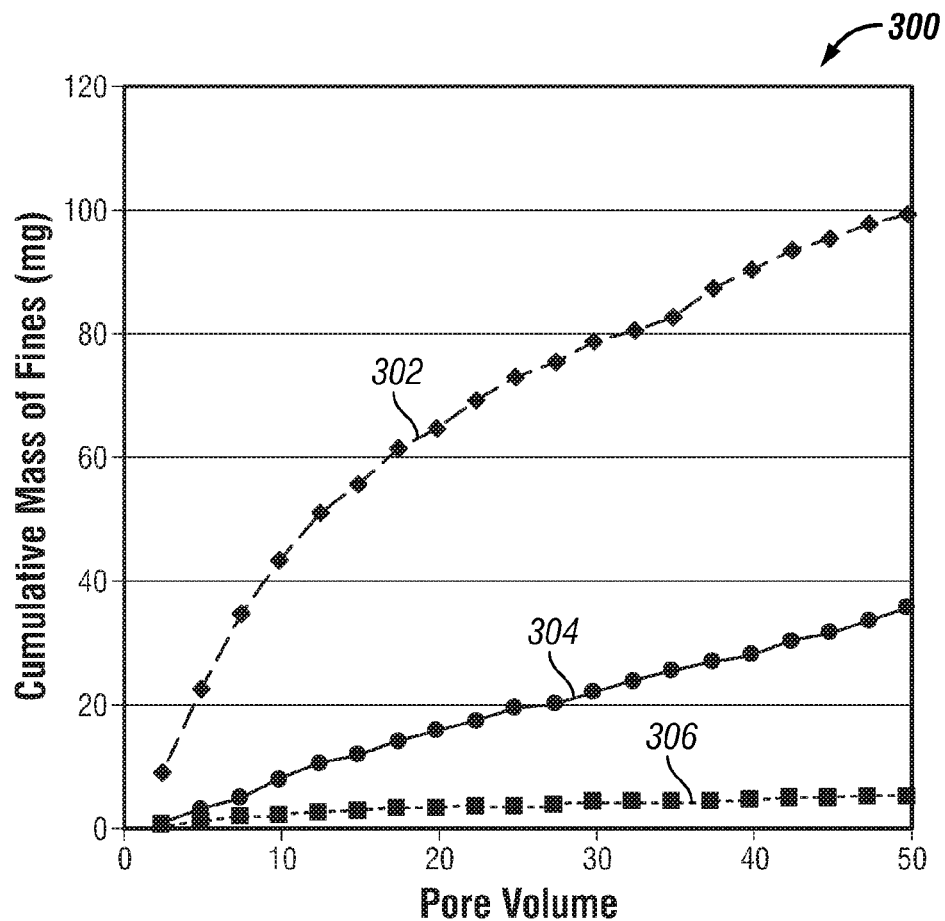
FIG. 3 is another illustration of fines migration control data for a treatment fluid.

FIG. 3 is an illustration 300 of fines migration control data for a treatment fluid, with tests for a baseline fluid and two fluids having fines migration compositions, and is based on lab data. The baseline curve 302 is repeated as illustrated in FIG. 2. In a fifth test (curve 306) the treatment fluid was the base fluid with added Arklear® 4042X at 0.2% by volume and 0.05% by volume of a 30% sodium hydroxide solution. In a sixth test (curve 304) the treatment fluid was the base fluid with added Arklear® 4042X at 0.05% by volume and 0.03% by volume of a 30% sodium hydroxide solution. The test data from FIG. 3 indicates that the concentration of the fines migration composition can be tested and selected to balance fines migration control with fluid cost. In certain embodiments, the lower fines migration control performance of a lower concentration of the fines migration composition is an economic tradeoff with the corresponding lower cost of the treatment fluid.

Figure 4:
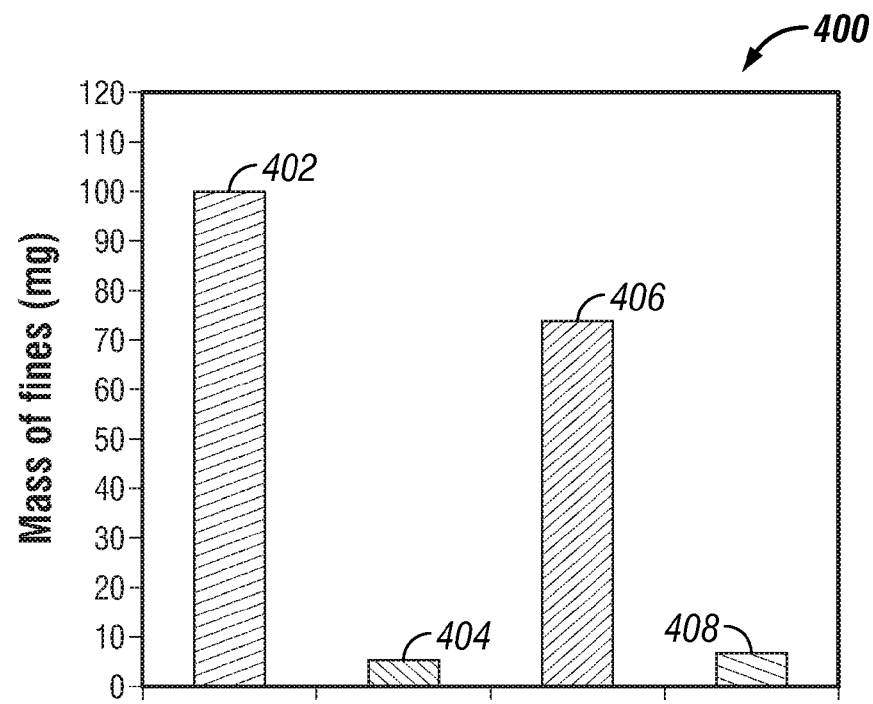
FIG. 4 is an illustration of fines migration performance data for a treatment fluid.
Figure 5:
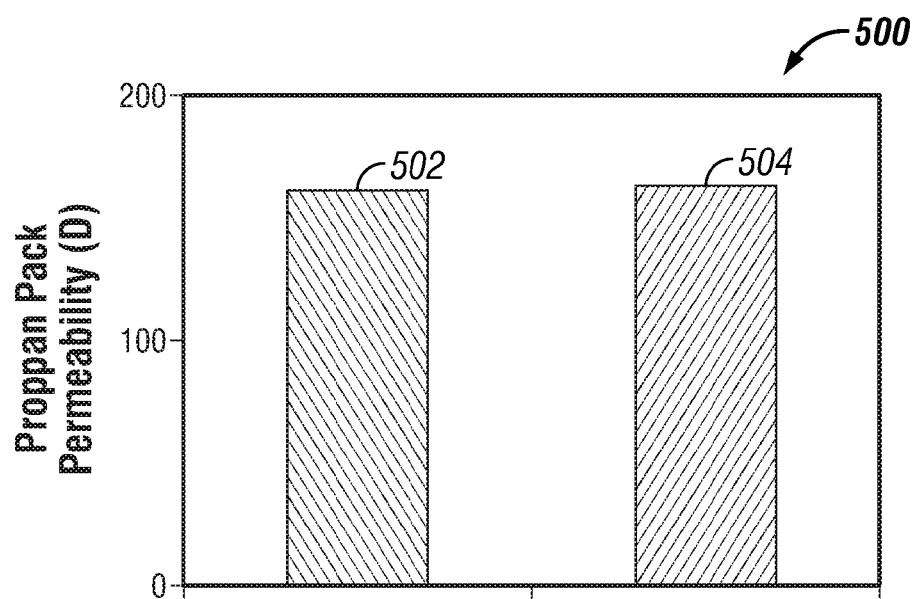
FIG. 5 is an illustration of proppant pack retained permeability for a fines migration controlling treatment fluid.

FIG. 4 is an illustration 400 of a first baseline test 402 at 150° F. and a second baseline test 406 at 225° F. utilizing the base fluid. The illustration 400 is based on lab data. A first fines migration control test 404 includes Arklear® 4042X in the base fluid at 0.2% by volume and at 150° F. A second fines migration control test 408 includes Arklear® 4042X in the base fluid at 0.2% by volume and at 225° F. FIG. 4 illustrates that an exemplary fines migration control composition is effective at a range of temperatures. FIG. 5 is an illustration 500 of a first baseline test 502 of retained proppant pack permeability for the baseline fluid, and a first fines migration control test 504 of retained proppant pack permeability for the treatment fluid including the fines migration composition—Arklear® 4042X at 0.2% by volume in the example of FIG. 5. The base fluid formulation in FIG. 5 was 2 wt % KCl, 0.76 vol % guar slurry (40 wt %), 0.0375 vol % sodium hydroxide solution (30 wt %), 0.0012 wt % ammonium persulfate, and 0.2125 vol % sodium tetra-borate deca-hydrate solution (18.5 wt %). FIG. 5 illustrates that an exemplary fines migration control composition does not negatively impact retained proppant pack permeability, and is based on lab data.

Figure 6:
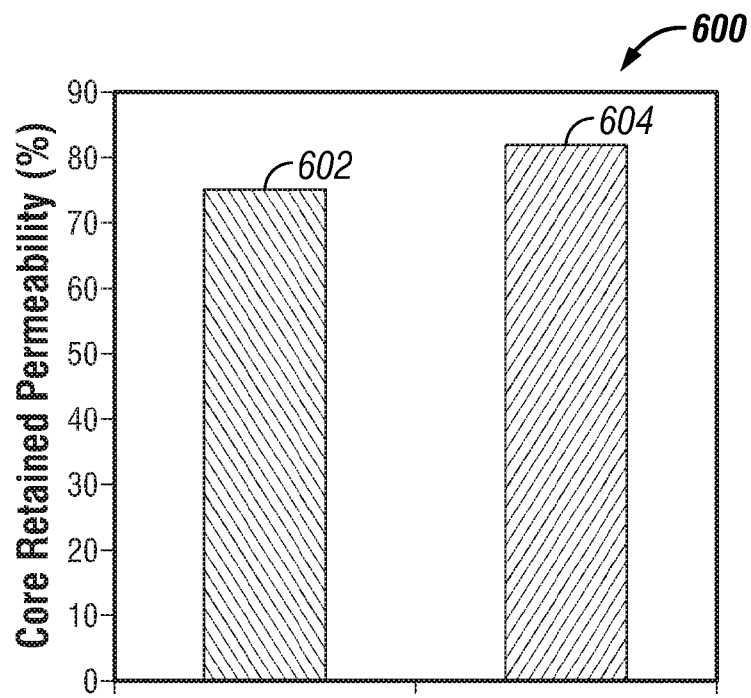
FIG. 6 is an illustration of an earth formation retained permeability for a fines migration controlling treatment fluid.

FIG. 6 is an illustration 600 of a first baseline test 602 core retained permeability for the baseline fluid, and a first fines migration control test 604 core retained permeability for the treatment fluid including the fines migration composition—Arklear® 4042X at 0.2% by volume in the example of FIG. 6. The base fluid formulation in FIG. 6 was 0.2 vol % tetra methyl ammonium chloride solution (50 wt %), 0.76 vol % guar slurry (40 wt %), 0.275 vol % sodium tetraborate decahydrate solution (18.5 wt %), 0.025 wt % sodium persulfate. The treatment fluid including the fines migration composition formulation was 0.2 vol % tetra methyl ammonium chloride solution (50 wt %), 0.76 vol % guar slurry (40 wt %), 0.4 vol % sodium tetraborate decahydrate solution (18.5 wt %), 0.2 vol % Arklear 4042X, and 0.05 ppt wt % sodium persulfate. FIG. 6 illustrates that an exemplary fines migration control composition does not negatively impact, and can even moderately enhance, core retained permeability, and is based on lab data.

Figure 7:
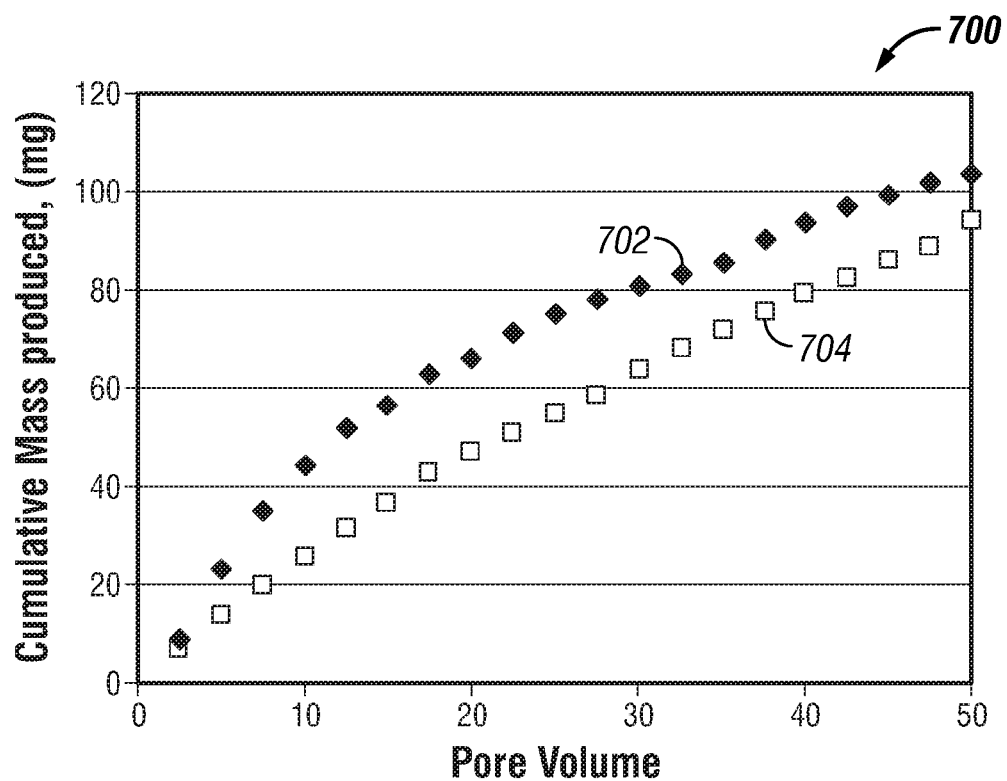
FIG. 7 is an illustration of a fines migration control performance of a leak-off filtrate of a treatment fluid.
Figure 8:
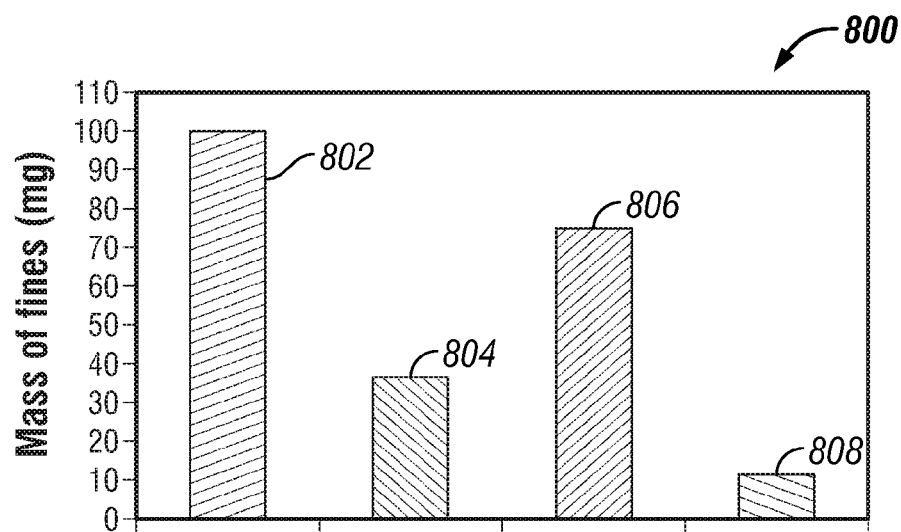
FIG. 8 is an illustration of fines migration performance data for a treatment fluid.

FIG. 7 is an illustration 700 of the fines migration response of a base fluid test (curve 702) and a simulated filtrate test (curve 704). The simulated filtrate was created by performing a fluid loss experiment and includes Arklear® 4042X at 0.2% by volume. While it is believed that the experimental conditions of FIG. 7 produced an over-diluted filtrate, nevertheless the simulated filtrate test 704 indicates that some fines migration control is achieved. FIG. 8 is an illustration 800 of a first baseline test 802 at 150° F. and a second baseline test 806 at 225° F. utilizing the base fluid. The illustration 800 is based on lab data. A first fines migration control test 804 includes Tekstim® EC9535A in the base fluid at 0.05% by volume and at 150° F. A second fines migration control test 808 includes Tekstim® EC9535A in the base fluid at 0.05% by volume and at 225° F. FIG. 8 illustrates that an exemplary fines migration control composition is effective at a range of temperatures.

Figure 9:
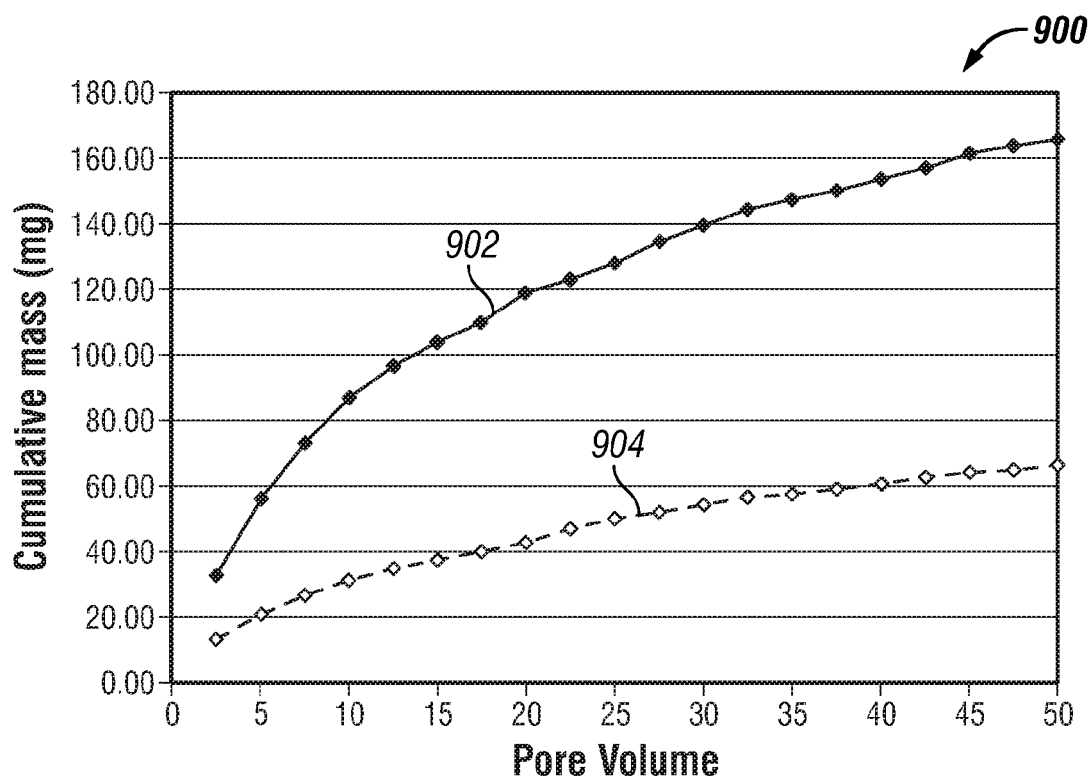
FIG. 9 is another illustration of fines migration control data for a treatment fluid.
Figure 10:
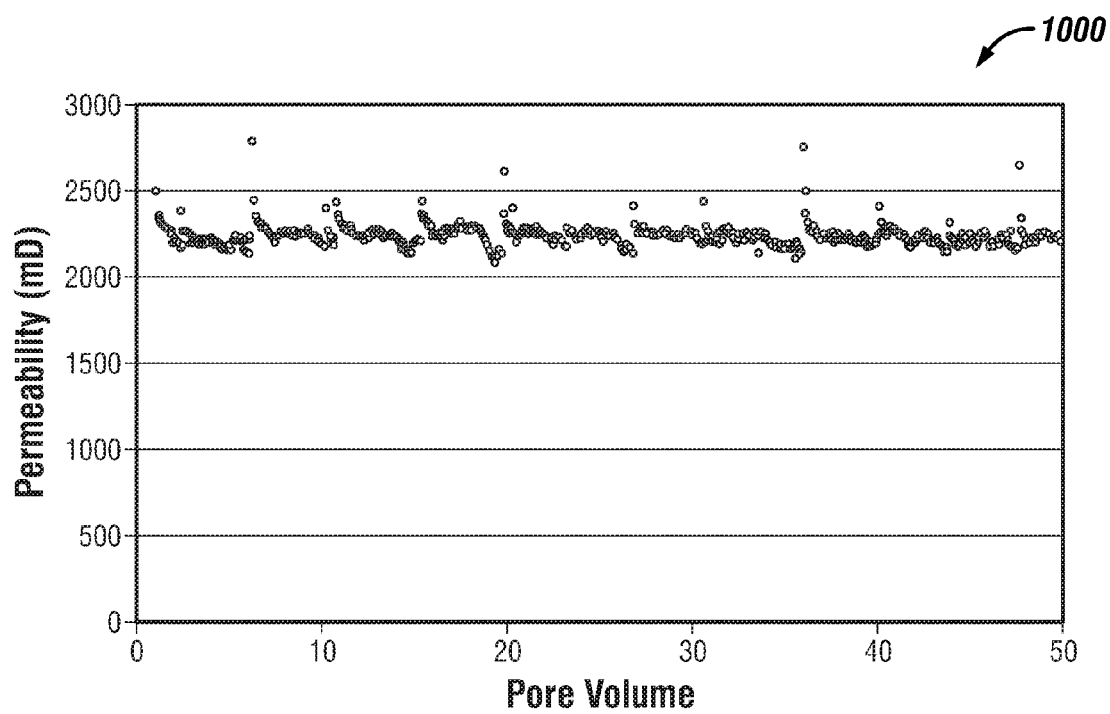
FIG. 10 is another illustration of fines migration control data for a treatment fluid.

FIG. 9 is an illustration 900 of fines migration control performance of 0.2 vol % Arklear 4042X at 150° F. (curve 904) relative to a base fluid (curve 902). The data in FIG. 9 is determined from flowing 50 pore volumes of brine through a sand pack containing 5% by weight kaolinite. FIG. 10 is an illustration 1000 of the sand pack permeability using a treatment fluid including the base fluid with added Arklear® 4042X at 0.2% by volume and 0.075% by volume of a 30% sodium hydroxide solution. The sand pack exhibits a stable permeability as fluid is produced through the sand pack.

The following descriptions provide exemplary and non-limiting information about various aspects of the treatment fluid polymer, base fluid, proppants, viscosifying mechanisms, and fluid additives. The examples and descriptions are illustrative only. To enhance or increase the production of oil and gas hydrocarbons from wells bored into subterranean formations, it has been common practice to pump a viscous fluid at high pressures down in to the well bore to fracture the formation and force the fracturing fluid into those fractures. The fracturing fluid is also used to carry sand or other types of particles, called proppants, to hold the fractures open when the pressure is relieved. The fractures held open by the proppant provide additional paths for the oil or gas to reach the wellbore, which increases production from the well.

In some cases, it is desirable to thicken the fracturing fluids with thickeners. Thickeners such as polymers including guar gum, derivatized guar gum, celluloses, etc., are commonly used. Any of these types of polymers may be used in accordance with some embodiments. The viscosity of solutions of guar gum, celluloses and similar thickeners may also be enhanced by crosslinking.

In some instances, when crosslinkers are used in wellbore treatment fluids for subterranean applications, in some embodiments, a hydratable polymer is placed into and hydrated in a mixwater, which can contain other ingredients such as surfactants, salts, buffers, and temperature stabilizers. A crosslinker solution is added prior to the fluid mixture being pumped into the well. The liquid crosslinker additive concentrations typically range from about 0.01% to 1.0% by volume, based upon total fluid volume. Alternatively, the fluids can be used without a crosslinker for the same applications, depending upon the particular needs.

The fluids may be for hydraulically fracturing a subterranean formation. Techniques for hydraulically fracturing a subterranean formation are known to persons of ordinary skill in the art, and involve pumping a fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference.

In various embodiments, hydraulic fracturing involves pumping a proppant-free viscous fluid, or pad—usually water with some fluid additives to generate high viscosity—into a well faster than the fluid can escape into the formation so that the pressure rises and the rock breaks, creating artificial fractures and/or enlarging existing fractures. Then, proppant particles are added to the fluid to form a slurry that is pumped into the fracture to prevent it from closing completely when the pumping pressure is released. In the fracturing treatment, treatment fluids including a fines migration control composition are used in the pad treatment, the proppant stage, or both.

Other useful viscosifiers or thickeners include such polysaccharides as the galactomannans. The term galactomannans refers in various aspects to natural occurring polysaccharides derived from various endosperms of seeds. They are primarily composed of D-mannose and D-galactose units. They generally have similar physical properties, such as being soluble in water to form thick highly viscous solutions which usually can be gelled (crosslinked) by the addition of inorganic salts such as borax. Examples of some plants producing seeds containing galactomannan gums include Tara, Huizache, locust bean, Pola verde, Flame tree, guar bean plant, Honey locust, Lucerne, Kentucky coffee bean, Japanese pagoda tree, Indigo, Jenna, Rattlebox, Clover, Fenugreek seeds and soy bean hulls. The gum is provided in a particulate form or in a ready made slurry such as being dissolved in a hydrocarbon. Of these polysaccharides, guar and its derivatives are commonly utilized. Guar and derivatives include guar gum, carboxy-methyl guar, hydroxy-ethyl guar, carboxy-methyl-hydroxy-ethyl guar, hydroxy-propyl guar, carboxy-methyl-hydroxy-propyl guar, guar hydroxyl-alkyl-triammonium chloride, and combinations thereof. As a galactomannan, guar gum is a branched copolymer containing a mannose backbone with galactose branches.

The viscosifying polymer may be present at any suitable concentration. In various embodiments hereof, the hydratable polymer can be present in an amount of from about 10 to less than about 60 pounds per thousand gallons of liquid phase, or from about 15 to less than about 40 pounds per thousand gallons, from about 15 to about 35 pounds per thousand gallons, 15 to about 25 pounds per thousand gallons, or from about 17 to about 22 pounds per thousand gallons. Generally, the polymer can be present in an amount of from about 10 to less than about 50 pounds per thousand gallons of liquid phase, with a lower limit of polymer being no less than about 10, 11, 12, 13, 14, 15, 16, 17, 18, or 19 pounds per thousand gallons of the liquid phase, and the upper limit being less than about 50 pounds per thousand gallons, no greater than 59, 54, 49, 44, 39, 34, 30, 29, 28, 27, 26, 25, 24, 23, 22, 21, or 20 pounds per thousand gallons of the liquid phase. In some embodiments, the polymers can be present in an amount of about 20 pounds per thousand gallons. Fluids incorporating a polymer may have any suitable viscosity, including a viscosity value of about 50 mPa-s or greater at a shear rate of about $100\ s^{-1}$ at treatment temperature, in certain embodiments about 75 mPa-s or greater at a shear rate of about $100\ s^{-1}$, and in certain further embodiments about 100 mPa-s or greater, in some instances. The increasing viscosity of the polymer fluid enhances fracture geometry generation and proppant carrying capacity.

In certain embodiments a treatment fluid includes a surfactant, which may provide viscosity and/or aid the dispersion and/or stabilization of a gas component (e.g. nitrogen or carbon dioxide) into the base fluid to form an energized fluid. Viscoelastic surfactants, such as those described in U.S. Pat. No. 6,703,352 (Dahayanake et al.) and U.S. Pat. No. 6,482,866 (Dahayanake et al.), both incorporated herein by reference, are also suitable for use in fluids of the invention. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic). The zwitterionic surfactant has a permanently positively charged moiety in the molecule regardless of pH and a negatively charged moiety at alkaline pH.

In certain embodiments, the surfactant is a cationic, zwitterionic or amphoteric surfactant containing an amine group or a quaternary ammonium group in its chemical structure ("amine functional surfactant"). A particularly useful surfactant is the amphoteric alkyl amine contained in the surfactant solution Aquat 944® (available from Baker Petrolite of 12645 W. Airport Blvd, Sugar Land, Tex. 77478 USA). In other embodiments, the surfactant is a blend of two or more of the surfactants described preceding, or a blend of any of the surfactant or surfactants described preceding and further including one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in embodiments having a surfactant-viscosified treatment fluid and/or an aqueous energized fluid. In certain embodiments, the fluids incorporate the surfactant or blend of surfactants in an amount of about 0.02 wt % to about 5 wt % of total liquid phase weight, and in further embodiments from about 0.05 wt % to about 2 wt % of total liquid phase weight. One particularly useful surfactant is sodium tridecyl ether sulfate.

Friction reducers may also be included in the treatment fluid, including any friction reducer known in the art. Certain polymers also reduce fluid friction, including at least polyacrylamide, polyisobutyl methacrylate, polymethyl methacrylate and polyisobutylene as well as water-soluble friction reducers such as guar gum, guar gum derivatives, polyacrylamide, and polyethylene oxide. Commercially available drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as fluid loss additives reducing or even eliminating the need for conventional fluid loss additives. Latex resins or polymer emulsions may be incorporated as fluid loss additives. Shear recovery agents may also be used in certain embodiments.

The treatment fluid may further include a breaker. The purpose of this component is to "break" or diminish the viscosity of the fluid so that the remainder fluid after the treatment is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly creates the borate crosslinks. Lowering the pH can reversibly breaks the borate crosslinks. At pH above about 8, the borate ion exists and is available to crosslink and cause gelling. At lower pH, the borate is tied up by hydrogen and is not available for crosslinking, thus gelation caused by borate ion is reversible.

In certain embodiments, the treatment fluid in at least some stages of the treatment includes particles, such as proppant or gravel, that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well.

If sand is used, it will typically be from about 12 to about 100 U.S. Standard Mesh in size depending upon various considerations including the sand, the expected closure stress of the formation, and the expected final conductivity of the fracture. With synthetic proppants, mesh sizes about 8 or greater may be used.

Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particularization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981.

The concentration of proppant in the fluid can be any concentration known in the art, and will sometimes be in the range of from about 0.03 to about 3 kilograms of proppant added per liter of liquid phase. Also, any of the proppant particles can further be coated with a resin to potentially improve the strength, clustering ability, and/or flow back properties of the proppant.

The aqueous medium of the base fluid and/or treatment fluid may be water or brine. Where the aqueous medium is a brine, the brine includes water and an organic or inorganic salt. Exemplary organic salts include alkali metal halides, sodium formate, and/or potassium formate. Exemplary inorganic salts include potassium chloride, sodium chloride, a mono-valent salt, a di-valent salt, calcium halides, calcium chloride, calcium bromide, sodium bromide, potassium bromide, and/or cesium bromide. The salt is selected for compatibility reasons, for example compatibility with drilling fluids, reservoir fluids, reservoir solid matter compatibility (e.g. to prevent clay swelling or migration), completion fluids, and/or cleanup fluids. In certain embodiments, the salt is further selected to provide a desired density value, for example where a given density provides sufficient hydrostatic pressure to balance a well.

As is evident from the figures and text presented above, a variety of embodiments according to the present invention are contemplated.

An exemplary embodiment is a method including providing a treatment fluid having a viscosity greater than 0.01 Pa-s. Additionally or alternatively, the treatment fluid includes a viscosity greater than 0.1 Pa-s, greater than 0.3 Pa-s, and/or a cross-linked polymer based treatment fluid. The method further includes determining a fines migration composition soluble in an aqueous phase of the treatment fluid that is compatible with the treatment fluid, and that interacts to secure fines in an earth formation intersecting a wellbore within a fines reaction time. The method further includes adding an amount of the fines migration composition to the treatment fluid, treating the earth formation intersecting a wellbore with the treatment fluid, and leaking off a portion of the treatment fluid into the earth formation, where the leaked off portion includes at least a portion of the amount of the fines migration composition. The method further includes providing a residence time of the leaked off portion of the treatment fluid in the earth formation, where the residence time meets or exceeds the fines reaction time.

Certain embodiments of the method include cross-linking the treatment fluid. The treatment fluid may include a polymer that builds a filter-cake in response to fluid leak-off, where the leaking off the portion of the treatment fluid into the earth formation includes leaking off a portion of the aqueous phase of the treatment fluid through the filter-cake. The treatment may be a hydraulic fracture treatment, and the fines migration composition may be added during a pre-pad, pad, or during proppant stages of the hydraulic fracture treatment.

The fines migration composition includes a cationic poly-amine, an organosilane, and/or a poly-amine salt. In certain embodiments, the fines migration composition includes a cationic poly-amine, and the method further includes adding an amount of an organosilane to the treatment fluid. In certain embodiments, treating the earth formation includes performing a hydraulic fracturing operation, a gravel pack operation, and/or a fracture and gravel pack operation.

Another exemplary embodiment is a system including a wellbore intersecting an earth formation, a pump fluidly coupled to the wellbore on a downstream side and to a blender on an upstream side, and a treatment fluid having a viscosity greater than 0.01 Pa-s. The system further includes a means for controlling fines migration from the earth formation after the pump delivers the treatment fluid into the earth formation. Certain embodiments of the system further include an offshore location, wherein the pump and the blender are positioned at the offshore location.

An exemplary means for controlling fines migration includes a cationic poly-amine. An embodiment includes the cationic poly-amine as Arklear® 4042X, where the treatment fluid includes a cross-linked polymer that cross-links above a pH of 10. Another embodiment includes the cationic poly-amine as Arklear® 4045, Arklear® 4065, and/or Arklear® 4042x, where the treatment fluid may be a cross-linked polymer fluid that cross-links below a pH of 10. In further embodiments, the treatment fluid includes an amount of a pH buffer that offsets a pH effect of the cationic poly-amine.

Yet another exemplary embodiment is a treatment fluid for treating an earth formation intersecting a wellbore, including a cross-linked polymer fluid, and an amount of a cationic poly-amine in an aqueous phase of the cross-linked polymer fluid. The amount of the cationic poly-amine includes an effective amount to substantially lock fines in the earth formation in a leakoff region of the earth formation. The amount of the cationic poly-amine may be determined by core tests, an amount at least equal to 0.025% by volume, an amount at least equal to 0.05% by volume, and/or an amount at least equal to 0.2% by volume.

The cationic poly-amine further includes a material that is compatible with a chemistry of the cross-linked polymer fluid, and that does not precipitate in the cross-linked polymer fluid. In certain embodiments, the cationic poly-amine includes a water clarifier that may be Arklear® 4042x, Arklear® 4045, and/or Arklear®4065. The treatment fluid includes a cross-linked polymer that may cross-link at a pH below 10. Certain embodiments of the treatment fluid include an amount of a pH buffer that offsets a pH effect of the cationic poly-amine, and/or an organosilane.

Yet another exemplary embodiment is a method including providing a treatment fluid structured for a wellbore treatment, where the wellbore treatment is a fracture treatment, a gravel pack treatment, and/or a frac and pack treatment. The method further includes determining a water clarifier that does not produce a precipitate in the treatment fluid, and adding the water clarifier to the treatment fluid in an amount effective to control fines migration in an earth formation. The method further includes treating the earth formation with the treatment fluid. In certain embodiments, the treatment fluid includes a polymer that builds a filter-cake in response to fluid leak-off, and the method further includes leaking off a portion of the treatment fluid into the earth formation, where the leaked off portion includes at least a portion of the water clarifier. The water clarifier may be a cationic poly-amine, and may be included in an amount of at least 0.025% by volume, at least 0.05% by volume, or at least 0.2% by volume.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   providing a treatment fluid comprising a viscosity greater than 0.01 Pa-s;
   determining a fines migration composition soluble in an aqueous phase of the treatment fluid;
   adding an amount of the fines migration composition to the treatment fluid;
   treating an earth formation intersecting a well bore with the treatment fluid leaking off a portion of the treatment fluid into the earth formation, the leaked off portion including at least a portion of the amount of the fines migration composition; and
   providing a residence time of the leaked off portion of the treatment fluid in the earth formation, the residence time comprising at least a fines reaction time to secure fines in the earth formation, wherein the leaking off the portion of the treatment fluid into the earth formation comprises leaking off a portion of the aqueous phase of the treatment fluid through a filter-cake.

2. The method of claim 1, wherein the treating the earth formation comprises a hydraulic fracture treatment, and wherein the adding the amount of the fines migration composition comprises adding the fines migration composition in a pad stage of the hydraulic fracture treatment.

3. The method of claim 1, wherein the treating the earth formation comprises fracturing earth formation, and wherein the adding an amount of the fines migration composition to the treatment fluid comprises adding the amount of the fines migration composition during at least one treatment stage selected from the treatment stages consisting of a prepad stage, a pad stage, and a proppant stage.

4. A method, comprising:
   providing a treatment fluid comprising a viscosity greater than 0.01 Pa-s;
   determining a fines migration composition soluble in an aqueous phase of the treatment fluid;
   adding an amount of the fines migration composition comprising an organosilane to the treatment fluid;
   treating an earth formation intersecting a well bore with the treatment fluid leaking off a portion of the treatment fluid into the earth formation, the leaked off portion including at least a portion of the amount of the fines migration composition; and
   providing a residence time of the leaked off portion of the treatment fluid in the earth formation, the residence time comprising at least the fines reaction time to secure fines in the earth formation.

5. A method, comprising:
   treating an earth formation intersecting a well bore with a treatment fluid comprising: a viscosity greater than 0.01 Pa-s, an aqueous phase and an amount of a fines migration composition soluble in the aqueous phase;
   building a filter cake on a surface of the treated earth formation;
   leaking off a portion of the treatment fluid through the filter cake into a leakoff region of the earth formation, the leaked off portion including at least a portion of the amount of the fines migration composition; and
   substantially locking fines in the leakoff region of the formation.

6. The method of claim 5, further comprising cross-linking a polymer in the treatment fluid.

7. The method of claim 5, wherein the treatment fluid further comprises a viscosity greater than 0.1 Pa-s.

8. The method of claim 5, wherein the treatment fluid further comprises a polymer that builds the filter-cake in response to the fluid leak-off.

9. The method of claim 5, wherein the fines migration composition comprises at least one chemical selected from the chemicals consisting of: a cationic poly-amine, an organosilane, and a poly-amine salt.

10. The method of claim 5, wherein the fines migration composition comprises a cationic poly-amine.

11. The method of claim 10, further comprising adding an amount of an organosilane to the treatment fluid.

12. The method of claim 10, wherein the treatment fluid further comprises a cross-linked polymer fluid that cross-links below a pH of 10.

13. The method of claim 10, wherein the treatment fluid further comprises an amount of a pH buffer that offsets a pH effect of the cationic poly-amine.

14. The method of claim 5, wherein the treating the earth formation comprises performing an operation selected from the operations consisting of:
   a hydraulic fracturing operation;
   a gravel pack operation;
   a remedial treatment;
   an acidizing treatment; and
   a hydraulic fracture and gravel pack operation.

15. The method of claim 5, further comprising determining that the fines migration composition is compatible with the treatment fluid, and determining that the fines migration composition interacts to secure fines in the earth formation within the fines reaction time.

16. The method of claim 5, wherein the treatment fluid comprises a pad stage of the hydraulic fracture treatment comprising the fines migration composition.

17. The method of claim 5, wherein the fines migration composition comprises a water clarifier.

18. The method of claim 17, wherein the water clarifier does not produce a precipitate in the treatment fluid.

19. The method of claim 5, wherein the treatment fluid further comprises a friction reducer.

20. The method of claim 5, wherein the treatment fluid further comprises a cross-linked polymer.

21. The method of claim 20, further comprising breaking the polymer.

22. The method of claim 21, wherein the treatment fluid further comprises a breaker for the polymer.

23. The method of claim 5, wherein the treatment fluid further comprises a viscoelastic surfactant.

24. A method, comprising:
- treating an earth formation intersecting a well bore with a treatment fluid in a hydraulic fracturing operation or a hydraulic fracture and gravel pack operation, wherein the treatment fluid comprises a pad stage comprising: a viscosity greater than 0.1 Pa-s (100 cP), a polymer that builds a filter cake, and at least 0.05 percent by volume of a cationic polyamine soluble in an aqueous phase of the treatment fluid;
- building a filter cake of the polymer on a surface of the treated earth formation; and
- leaking off a portion of the treatment fluid through the filter cake into a leakoff region of the earth formation to substantially lock fines in the leakoff region.

* * * * *